United States Patent [19]
Junginger et al.

[11] Patent Number: 5,796,503
[45] Date of Patent: Aug. 18, 1998

[54] OPTICAL COMMUNICATION SYSTEM WHEREIN OPTICAL BEAT INTERFERENCE AT THE CENTER IS REDUCED

[75] Inventors: Bernhard Junginger, Leonberg; Joachim Selinger, Stuttgart, both of Germany

[73] Assignee: Alcatel Alsthom Compagnie Generale D'Electricite, Paris, France

[21] Appl. No.: 791,416

[22] Filed: Jan. 24, 1997

[30] Foreign Application Priority Data

Jan. 31, 1996 [DE] Germany .................. 196 03 403.5

[51] Int. Cl.$^6$ .................................................. H04J 14/02
[52] U.S. Cl. ........................ 359/125; 359/167; 359/133
[58] Field of Search ................................. 359/125, 133, 359/137, 164, 167, 173, 188, 195

[56] References Cited

U.S. PATENT DOCUMENTS

| | | | |
|---|---|---|---|
| 5,134,509 | 7/1992 | Olshanky et al. | 359/132 |
| 5,398,129 | 3/1995 | Reimann | 359/137 |
| 5,491,575 | 2/1996 | Neidlinger et al. | 359/137 |
| 5,572,349 | 11/1996 | Hale et al. | 359/137 |

OTHER PUBLICATIONS

"Subcarrier Multiplexing for Multiple–Access Lightwave Networks" In: Journal of Lightwave Technology, vol. LT–5, No. 8, Aug. 1987, S. 1103–1110.

"Operation of a Passive Optical Network with Subcarrier Multiplexing in the Presence of Optical Beat Interference", Journal of Lightwave Technology, vol. 11, No. 10, Oct. 1993, s. 1632–1640.

Wood et al., "Operation of a Passive Optical Network with Subcarrier Multiplexing in the Presence of Optical Beat Interference", Journal of Lightwave Technology, vol. 11, No. 10, pp. 1632–1640, Oct. 1993.

*Primary Examiner*—Knife-Michael Negash
*Attorney, Agent, or Firm*—Milton Oliver; Ware, Fressola, Van der Sluys & Adolphson LLP

[57] ABSTRACT

An optical communication system is described wherein a center (1) and distant terminals (3, 4) are connected to a fiber-optic network (2). Each of the terminals (3, 4) has a light source (5, 7) and a modulator (6, 8) connected thereto for transmitting optical signals to the center (1). Each of the modulators (6, 8) controls the respective light source (5, 7) in such a way that the light source (5, 7) emits light only within successive first time intervals $T_{1L}$, $T_{2L}$ which are separated by second time intervals $T_{1D}$, $T_{2D}$ and that the first time intervals $T_{1L}$, $T_{2L}$ are shorter than the second time intervals $T_{1D}$, $T_{2D}$.

6 Claims, 1 Drawing Sheet

OPTICAL COMMUNICATION SYSTEM WHEREIN OPTICAL BEAT INTERFERENCE AT THE CENTER IS REDUCED

TECHNICAL FIELD

The invention relates to an optical communication system herein a center is connected to a number of terminals by a fiber-optic network, wherein each of the terminals has a light source and a modulator for transmitting optical signals to the center, wherein each of the modulators controls the respective light source connected thereto by a modulating signal, and wherein the center has a device for receiving the optical signals. It also relates to an optical transmitter for terminals contained in an optical communication system, wherein the optical transmitter comprises a light source and a modulator which controls the light source by a modulating signal.

BACKGROUND OF THE INVENTION

An optical communication system and an optical transmitter are known, for example, from a publication by T. H. Wood et al., "Operation of a Passive Optical Network with Subcarrier Multiplexing In the Presence of Optical Beat Interference", Journal of Lightwave Technology, Vol. 11, No. 10, October 1993, pages 1632 to 1640. This publication also teaches that a problem arises in optical communication systems with subcarrier multiplexing in that—under unfavorable conditions—optical beat interferences may develop at a center (head end) in said optical communication system. These optical interferences are known as "optical beat interference (OBI)."

An explanation for this phenomenon is based on an optical communication system known as "fiber in the loop (FITL) system" comprising a center, a fiber-optic network (passive optical network, PON) and a number of distant terminals. In each terminal there is provided a laser for transmitting outgoing signals. The outgoing signals transmitted from the individual terminals to the center will have to be separated at the center for evaluation. For this purpose, there are provided at the center a coupler, a photodetector and frequency selective means. Three multiplexing methods exist for separating the outgoing signals at the center: wavelength division multiplexing (WDM), time division multiplexing (TDM) and subcarrier multiplexing (SCM).

In optical communication systems using the SCM method, the laser in each distant terminal is modulated by a modulation signal having a carrier frequency which is characteristic for the respective distant terminal. This is advantageous in that the wavelengths of the light emitted by the lasers and the exact time when the individual distant terminals are transmitting, do not have to be monitored to the same accuracy as would be required with the WDM and TDM multiplexing. However, with the SCM method there exists the problem associated with optical beat interferences as mentioned before, which occur when at least two lasers emit light at the same wavelength. The publication describes that the optical beat interferences can be reduced by increasing the modulation index m of each sinusoidal modulating signal; two values have been reported for the modulation index: m=0.8 and m=1.8. This leads to a spectral broadening of the light emitted by a laser. It is furthermore described that the beat interferences can also be reduced by other measures which broaden the spectrum, e.g. by the spread-spectrum technique. These measures, however, are technically difficult to implement.

SUMMARY OF THE INVENTION

It is therefore an object of the invention to provide an optical system where the optical beat interferences are reduced by less exacting measures. An optical communication system solving this objective is one where each of the modulators controls the respective light source in such a way that the light source emits light only within successive first time intervals which are separated by second time intervals, and that the first time intervals are shorter than the second time intervals.

It is a further object of the invention to provide an optical transmitter for an optical communication system. In such an optical transmitter the modulator controls the respective light source in such a way that the light source emits light only within successive first time intervals which are separated by second time intervals, and that the first time intervals are shorter than the second time intervals.

BRIEF DESCRIPTION OF THE DRAWINGS

It is an advantage of the invention that the signal-to-noise ratio at the center is significantly improved.

Particular examples of the invention are described hereinafter with reference to the drawings, in which.

BEST MODE FOR CARRYING OUT THE INVENTION

Figure 1:
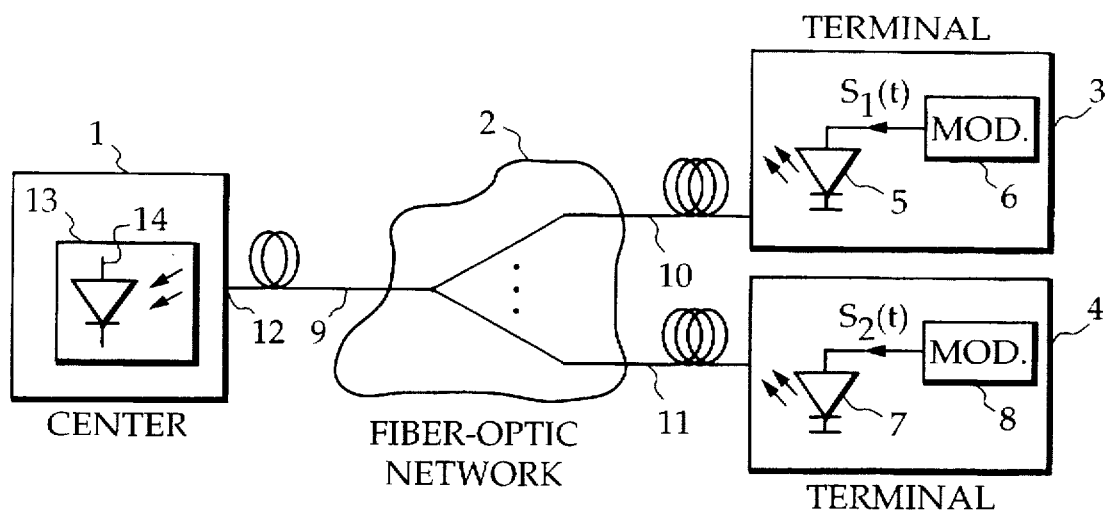
FIG. 1 is a block diagram of an optical communication system including a center and two distant terminals.

FIG. 1 shows a block diagram of an optical communication system including a center 1 and two distant terminals 3, 4. The center 1 and the distant terminals 3, 4 are connected to a fiber-optic network 2. The fiber-optic network 2 usually consists of a plurality of individual optical fiber segments connected to each other via optical splitters and possibly also via optical amplifiers for distributing the light emitted from the center 1 to a plurality of distant terminals 3, 4. The emitted light is usually modulated by information signals, thereby generating a signal to be distributed. In the optical communication system shown in FIG. 1, a connection 12 at the center 1 is connected to the fiber-optic network 2 via an optical fiber 9. The distant terminal 3 is connected to the fiber-optic network 2 via an optical fiber 10 and the distant terminal 4 is connected via an optical fiber 11. The optical fibers 9, 10, 11 form a part of the fiber-optic network 2 and are shown individually in order to provide a clearer description.

The center 1 is provided with a device 13 for receiving the optical signals transmitted by the distant terminals 3, 4. In the device 13 there is shown a photodetector 14 which converts the optical signals into electrical signals, in order to emphasize that optical signals are received. The optical signals received at the center 1 are coupled out of the optical fiber 9 and supplied to the photodetector 14. In addition, there are means provided at the center 1 for generating an optical signal for distribution by known methods and for coupling said signal into the optical fiber 9; the aforementioned means are not shown in FIG. 1.

Aside from the terminals 3, 4 capable of sending signals to the center 1 and thereby utilizing interactive services, in an optical communication system there may be connected to the fiber-optic network 2 additional terminals which do not desire interactive services. Hereinafter, only those terminals 3, 4 will be considered which desire to use interactive services.

Each terminal 3, 4 includes a laser 5, 7 as a light source and a modulator 6, 8 which controls the laser 5, 7 through a modulating signal $S_1(t)$, $S_2(t)$. The laser 5, 7 and the modulator 6, 8 form an optical transmitter located in the distant terminal 3, 4. The lasers 5, 7 transmit the optical signals to the center 1 by the SCM method, as described in the publication by T. H. Wood referenced above. The modulating signal $S_1(t)$, $S_2(t)$ may be superimposed on a laser bias current having a value corresponding to the threshold current of the laser 5, 7. Modulating signal $S_1(t)$, $S_2(t)$ and laser bias current in combination form a laser current controlling the laser 5, 7. The light emitted from the laser 5, 7 has an intensity dependence corresponding to the modulating signal $S_1(t)$ $S_2(t)$. In addition, each distant terminal 3, 4 includes means for extracting from the optical fiber 10, 11 the optical signal transmitted by the center 1 using methods known in the art, for converting the optical signal into an electrical signal, for demodulating the signal and, e.g., supplying the signal to a TV receiver; these means are not shown in FIG. 1.

According to the basic concept of the invention, each modulator 6, 8 controls the light source 5, 7 in such a way that the light source 5, 7 emits light only during successive time intervals $T_{1L}$, $T_{2L}$, which are separated by time intervals $T_{1D}$, $T_{2D}$, wherein the time intervals $T_{1L}$, $T_{2L}$ are shorter than the time intervals $T_{1D}$, $T_{2D}$.

The modulating signal $S_1(t)$, $S_2(t)$ are consequently selected in such a way that they have a periodic, non-sinusoidal time dependence, an as large as possible first Fourier coefficient $a_1$ and an as small as possible constant part (Fourier coefficient $a_0$). Consequently, the ratio of $a_1$ to $a_0$ is maximized.

Figure 2:
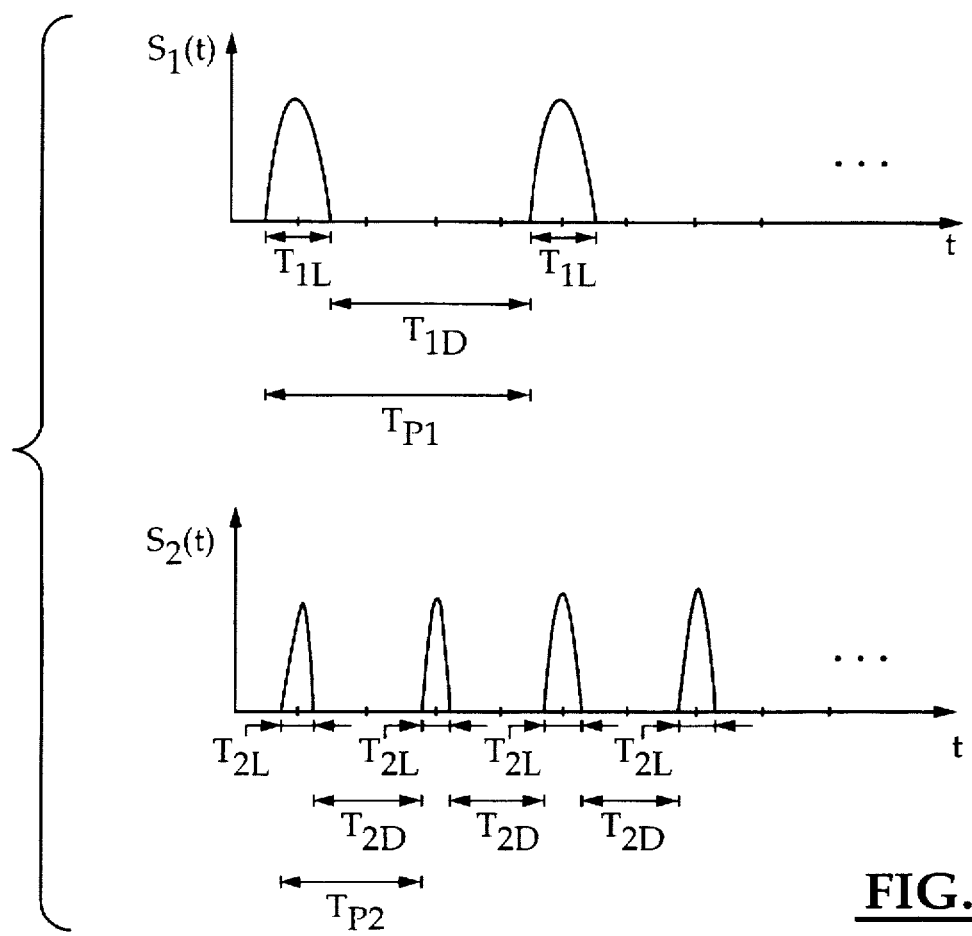
FIG. 2 shows representations of two modulating signals as a function of time.

In FIG. 2 there is shown a schematic representation of the modulating signals $S_1(t)$, $S_2(t)$ as a function of time t. The modulating signal $S_1(t)$ of the modulator 6 is a sequence of cusps of sine waves occurring during successive time intervals $T_{1L}$. The time intervals $T_{1L}$ are separated by time intervals $T_{1D}$. Illustrated are two time intervals $T_{1L}$ (cusps of sine waves) separated by a time interval $T_{1D}$. The sum of the time interval $T_{1L}$ and the time interval $T_{1D}$ is the time period $T_{P1}$. The modulating signal $S_2(t)$ of the modulator 8 is also a sequence of cusps of sine waves occurring during successive time intervals $T_{2L}$. The time intervals $T_{2L}$ are separated by time intervals $T_{2D}$. The sum of the time interval $T_{2L}$ and the time interval $T_{2D}$ is the time period $T_{P2}$. Illustrated are four time intervals $T_{2L}$ (cusps of sine waves) separated by three time intervals $T_{2D}$. During the time between two consecutive cusps of sine waves, the modulating signal $S_1(t)$, $S_2(t)$ has the value zero, i.e. during this time the laser current remains always below the threshold current value, with the result that the laser 5, 7 does not emit light.

For each modulating signal $S_1(t)$, $S_2(t)$ there is provided a repetition frequency $1/T_{P1}$, $1/T_{P2}$ with the general relationship $1/T_{P1} \neq 1/T_{P2}$. Furthermore, $T_{1L}/T_{1D} = T_{2L}/T_{2D}$.

When the modulating signal $S_1(t)$, $S_2(t)$ is selected in accordance with the present description, the signal-to-noise ratio at the center 1 is improved by about 6 dB.

As an alternative to the modulating signals $S_1(t)$, $S_2(t)$ illustrated above which employ cusps of sine waves, a ramp ("saw tooth" dependence) or a square wave dependence within the time intervals $T_{1L}$, $T_{2L}$ may also be selected. In addition, any other shape or form providing an advantageous result may also be chosen.

What is claimed is:

1. An optical communication system wherein a center (1) is connected to a number of terminals (3, 4) by a fiber-optic network (2), wherein each of the terminals (3, 4) has a light source (5, 7) and a modulator (6, 8) for transmitting optical signals to the center (1), wherein each of the modulators (6, 8) controls the respective light source (5, 7) connected thereto by a modulating subcarrier signal (($S_1(t)$, $S_2(t)$), and wherein the center (1) has a device (13) for receiving the optical signals, characterized in that each of the modulators (6, 8) controls the respective light source (5, 7) in such a way that the light source (5, 7) emits light only within successive first time intervals ($T_{1L}$, $T_{2L}$) which are separated by second time intervals ($T_{1D}$, $T_{2D}$), and that the first time intervals ($T_{1L}$, $T_{2L}$) are shorter than the second time intervals ($T_{1D}$, $T_{2D}$).

2. An optical transmitter for terminals (3, 4) contained in an optical communication system as claimed in claim 1, said optical transmitter comprising a light source (5, 7) and a modulator (6, 8) which controls the light source (5, 7) by a modulating subcarrier signal (($S^1(t)$, $S_2(t)$), characterized in that the modulator (6,8) controls the respective light source (5,7) in such a way that the light source (5, 7) emits light only within successive first time intervals ($T_{1L}$, $T_{2L}$) which are separated by second time intervals ($T_{1D}$, $T_{2D}$), and that the first time intervals ($T_{1L}$, $T_{2L}$) are shorter than the second time intervals ($T_{1D}$, $T_{2D}$).

3. An optical transmitter as claimed in claim 2, characterized in that in the first time intervals ($T_{1L}$, $T_{2L}$), the modulating signals (($S_1(t)$, $S_2(t)$) have the shape of a sine half-wave, a ramp, or a rectangle.

4. An optical transmitter as claimed in claim 3, characterized in that a respective repetition frequency ($1/T_{P1}$, $1/T_{P2}$) is fixed for each of the modulating signals (($S_1(t)$, $S_2(t)$), and that the repetition frequencies ($1/T_{P1}$, $1/T_{P2}$) are different.

5. An optical communication system as claimed in claim 1, characterized in that in the first time intervals ($T_{1L}$, $T_{2L}$), the modulating signals (($S_1(t)$, $S_2(t)$) have the shape of a sine half-wave, a ramp, or a rectangle.

6. An optical communication system as claimed in claim 5, characterized in that a respective repetition frequency ($1/T_{P3}$, $1/T_{P2}$) is fixed for each of the modulating signals (($S_1(t)$, $S_2(t)$), and that the repetition frequencies ($1/T_{P1}$, $1/T_{P2}$) are different.

* * * * *

UNITED STATES PATENT AND TRADEMARK OFFICE
CERTIFICATE OF CORRECTION

PATENT NO. : 5,796,503
DATED : August 18, 1998
INVENTOR(S) : Junginger et al.

It is certified that error appears in the above-identified patent and that said Letters Patent is hereby corrected as shown below:

Title page,
Item [57] ABSTRACT, line 9 please insert --,-- after "$T_{2D}$"

Column 4, line 54 (claim 6, line 3) please delete "$(1/T_{p3})$"

and insert --$(1/T_{p1})$--

Signed and Sealed this

Fifteenth Day of December, 1998

Attest:

Attesting Officer

BRUCE LEHMAN

Commissioner of Patents and Trademarks